US010334111B2

(12) United States Patent
Vagelos

(10) Patent No.: US 10,334,111 B2
(45) Date of Patent: Jun. 25, 2019

(54) DEVICE, SYSTEM, AND PROCESS FOR PROVIDING EMERGENCY CALLING SERVICE FOR A WIRELESS DEVICE USING VOICE OVER DATA

(71) Applicant: TracFone Wireless, Inc., Miami, FL (US)

(72) Inventor: Theodore Vagelos, Miami, FL (US)

(73) Assignee: TRACFONE WIRELESS, INC., Miami, FL (US)

(*) Notice: Subject to any disclaimer, the term of this patent is extended or adjusted under 35 U.S.C. 154(b) by 99 days.

(21) Appl. No.: 15/358,942

(22) Filed: Nov. 22, 2016

(65) Prior Publication Data
US 2017/0149983 A1 May 25, 2017

Related U.S. Application Data

(60) Provisional application No. 62/258,646, filed on Nov. 23, 2015.

(51) Int. Cl.
H04M 7/00 (2006.01)
H04W 64/00 (2009.01)
H04M 3/51 (2006.01)
H04W 48/18 (2009.01)
H04M 7/12 (2006.01)
H04W 4/02 (2018.01)
H04W 4/18 (2009.01)
H04W 4/90 (2018.01)

(52) U.S. Cl.
CPC ....... *H04M 7/0066* (2013.01); *H04M 3/5116* (2013.01); *H04W 64/00* (2013.01); *H04M 7/125* (2013.01); *H04M 2207/18* (2013.01); *H04W 4/02* (2013.01); *H04W 4/18* (2013.01); *H04W 4/90* (2018.02); *H04W 48/18* (2013.01)

(58) Field of Classification Search
CPC .. H04M 7/0066; H04M 7/125; H04M 3/5116; H04M 2207/18; H04W 4/90; H04W 4/18; H04W 4/02; H04W 48/18
USPC ........................................ 455/404.2
See application file for complete search history.

(56) References Cited

U.S. PATENT DOCUMENTS

2006/0293024 A1* 12/2006 Benco ................ H04M 7/006
455/404.2
2008/0293432 A1* 11/2008 Stewart ................ H04W 4/02
455/456.1

(Continued)

Primary Examiner — Kamran Afshar
Assistant Examiner — Farid Seyedvosoghi
(74) Attorney, Agent, or Firm — BakerHostetler LLP

(57) ABSTRACT

A system for providing emergency telephone call solutions for wireless devices using a voice over data network, the system having the voice over data network to recognize an emergency call from one of the wireless devices, to determine whether a cellular network is available to receive the emergency call, and to transmit the emergency call to the cellular network, a gateway for converting the emergency call between a first format for the voice over data network and a second format for a public switched telephone network associated with the cellular network, a mobile virtual network operator to communicate information associated with the emergency call to the cellular network and to the voice over data network, and the voice over data network and the cellular network to route the emergency call and the information associated with the emergency call to an emergency authority.

16 Claims, 5 Drawing Sheets

(56) References Cited

U.S. PATENT DOCUMENTS

| | | | | |
|---|---|---|---|---|
| 2010/0190466 A1* | 7/2010 | Borislow | ................ | H04W 4/90 |
| | | | | 455/404.2 |
| 2011/0009132 A1* | 1/2011 | Skarby | ................. | G01S 5/0263 |
| | | | | 455/456.5 |

* cited by examiner

DEVICE, SYSTEM, AND PROCESS FOR PROVIDING EMERGENCY CALLING SERVICE FOR A WIRELESS DEVICE USING VOICE OVER DATA

CROSS REFERENCE TO PRIOR APPLICATIONS

This application claims the benefit from U.S. Provisional Application No. 62/258,646 filed on Nov. 23, 2015, which is hereby incorporated by reference for all purposes as if fully set forth herein.

BACKGROUND OF THE DISCLOSURE

1. Field of the Disclosure

The disclosure relates to providing emergency calling solutions for wireless devices using voice over data networks. More particularly, the disclosure relates to a device, system, and process for providing emergency calling solutions for wireless devices using voice over data networks based on the availability of cellular voice networks.

2. Related Art

Users of wireless devices may often use voice over data networks or Voice Over Internet Protocol networks to facilitate voice communications over Internet protocols because of cost, convenience, and so on. With a traditional landline telephone, there is a direct correlation between the fixed location of the telephone making a phone call and the telephone number associated with the telephone. Because the location of a wireless device is not fixed like a landline telephone, however, precisely tracking the location of a wireless device may be difficult while using a voice over data network. Because there is no direct correlation in voice communications over Internet protocols between the location of the wireless device and the telephone number associated with the wireless device, routing emergency calls from a wireless device using a voice over data network to a corresponding emergency call center may also be imprecise and inefficient. Voice over data network calls may not include accurate and up-to-date location data, for example. Even if the voice communications over internee protocols include an IP address associated with a wireless device utilizing voice over data networks calling an emergency number, for example, the IP address may not correlate to the actual location of the wireless device as it makes the emergency call. This undermines the ability to provide applicable emergency call services to the wireless device using a voice over data network.

There is the need for the ability to consistently and effectively provide emergency call services to wireless devices using voice over data networks.

SUMMARY OF THE DISCLOSURE

The foregoing needs are met, to a great extent, by the disclosure by providing a device, system, and method for providing emergency calling solutions for wireless devices using voice over data networks. Convenience, timeliness, and reliability of the wireless providers' systems are key factors that play into a user's experience. By developing a system to improve at least these factors, a more positive experience can be provided to the user. The improved experience will help retain customer base and increase the amount of customers willing to purchase wireless services from Mobile Network Operators (MNOs) and Mobile Virtual Network Operators (MVNOs). In order to do so, the following needs can be addressed by with a solution for providing emergency calling service for wireless devices using voice over data.

According to some aspects of the disclosure, a wireless device configured to operate over a voice over data network and further configured to provide emergency telephone call solutions includes a transceiver configured to connect to a voice over data network and provide voice services; a processor configured to recognize an emergency call placed from the wireless devices while operating over the voice over data network; and the processor further configured to determine whether a cellular network is available to receive the emergency call, if the cellular network is available, the processor is further configured to transmit the emergency call over the cellular network.

According to some aspects of the disclosure, a system implementing a voice over data network configured to provide emergency telephone call solutions to a wireless device includes a server configured to implement, at least in part, a voice over data network and provide voice services to a wireless device; the server configured to recognize an emergency call placed from the wireless devices while providing the voice services over the voice over data network; and the server further configured to determine whether a cellular network is available for the wireless device to receive the emergency call, if the cellular network is available, the server is further configured to direct the wireless device to transmit the emergency call over the cellular network.

According to some aspects of the disclosure, a process of operating a wireless device over a voice over data network to provide emergency telephone call solutions includes connecting to a voice over data network and providing voice services with a transceiver over the voice over data network; recognizing an emergency call placed from the wireless devices with the processor; and determining whether a cellular network is available to receive the emergency call with the processor, if the cellular network is available, transmitting the emergency call over the cellular network with the transceiver.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspects of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
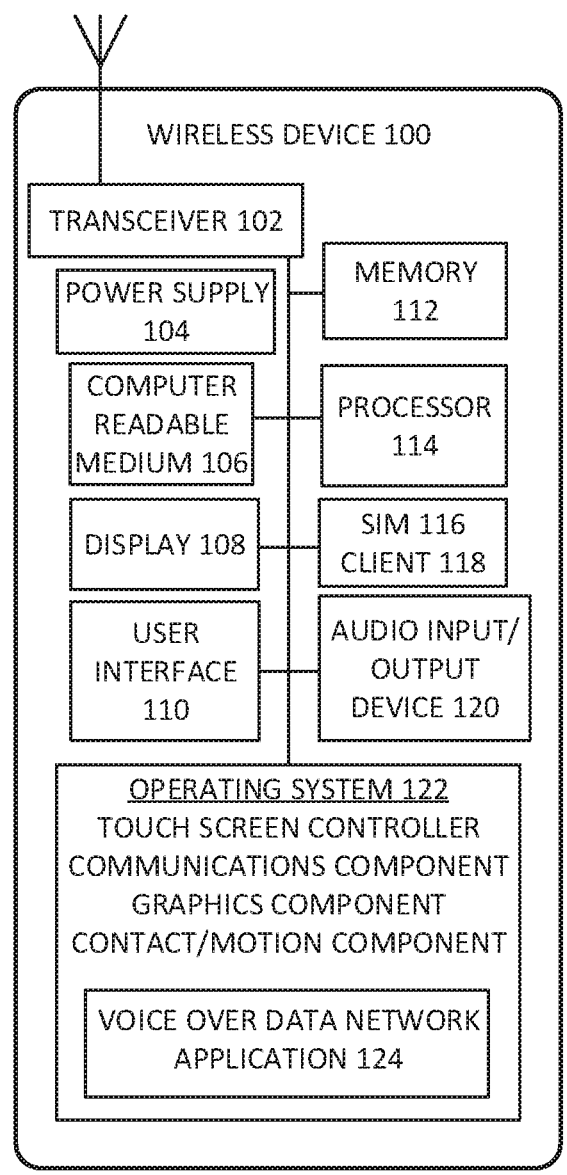
FIG. 1 illustrates a wireless device and its components, in accordance with aspects of the disclosure.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as, for example, 3G, 4G Long Term Evolution (LTE), 5G (5th generation mobile networks/wireless systems), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof that may utilize the teachings of the present application to provide emergency call services to wireless devices using voice over data networks.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Generally, companies that provide post-paid wireless services are wireless carriers or MNOs that maintain and control their own wireless networks. A MNO heavily relies on backend systems to address any provisional, billing, security and data issues that might threaten the health of their networks. On the other hand, a MVNO is a mobile operator that typically does not own its own frequency spectrum or have its own network infrastructure. MVNOs negotiate and enter into business agreements with third party wireless carriers or MNOs to purchase the right to use their networks for wireless services. MVNOs may offer wireless services on one or more networks operated by MNOs, including both cellular networks and voice over data networks available to wireless devices. The disclosure is applicable to wireless devices implemented only with MNOs and further applicable to wireless devices implemented on MNOs in coordination with service provided by MVNOs.

FIG. 1 illustrates an exemplary wireless device 100 and its potential components. The wireless device 100 may include a transceiver 102, a power supply 104, a computer readable medium 106, a display 108, a user interface 110, a memory 112, a processor 114, a subscriber identity module (SIM) card 116 (if applicable for the particular wireless device), a client 118, an audio input/output device 120, an operating system 122, and the like.

The transceiver 102 can include, for example, a wireless antenna and associated circuitry capable of data transmission with the mobile data network utilizing at least one data transmission protocol, such as, for example, 3G, 4G Long Term Evolution (LTE), 5G (5th generation mobile networks/wireless systems), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or combinations thereof. The transceiver 102 may transmit and receive data over the data transmission protocol, including information related to the location of the wireless device 100 and which networks are available for voice and data usage.

The display 108 of the wireless device 100 can display various information provided to the display 108 from the processor 114, the computer readable medium 106, or the SIM card 116. The screen may be a light-emitting diode display (LED), an electroluminescent display (ELD), a plasma display panel (PDP), a liquid crystal display (LCD), an organic light-emitting diode display (OLED), or any other display technology. The information may be displayed simultaneously or the user may interact with an input device such as buttons on the wireless device 100 or, if the display 108 is a touchscreen, with the icons on the display 108 to cycle through the various types of information for display.

For the purposes of this disclosure, the computer readable medium 106 may store computer data, which may include computer program code that may be executable by the processor 114 of the wireless device 100 in machine readable form. By way of example, and not limitation, the computer readable medium 106 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 106 or machine readable medium, which may be incorporated into a computer program product.

The processor 114 may also execute the data or applications on the wireless device 100. The processor 114 can be, for example, dedicated hardware as defined herein, a computing device as defined herein, a computer processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute functions on the wireless device 100.

The wireless device 100 may also have the power supply 104. The power supply 104 may be a battery such as nickel cadmium, nickel metal hydride, lead acid, lithium ion, lithium ion polymer, and the like. The wireless device 100 may also include the memory 112, which may be an internal memory or a removable storage type such as a memory chip. The memory 112 may store information about the wireless device 100, including the default and/or current location. Another information storage type that the wireless device may use is the SIM card 116. Additionally, the wireless device 100 may include the audio input/output device 120 for the input or output of sounds in phone calls, videos, music, and the like.

The wireless device 100 may also have a user interface 110 to facilitate use of the wireless device 100 with an operating system 122. The operating system 122 may be associated with a touchscreen controller, one or more communications components, one or more graphics components, one or more contact/motion components, and the like.

The wireless device 100 may also have a SIP client built into a firmware of the wireless device 100, a voice over data network application 124 implemented in the wireless device 100, or the like to provide voice over data network functionality. The SIP client and/or wireless device application may operate in conjunction with the voice over data network 202 to provide session control and signaling protocols to control the signaling, set-up, and tear-down of calls. The SIP client and/or the voice over data network application 124 may operate in conjunction with the voice over data network 202 to transport audio streams over IP networks using media delivery protocols that encode voice, audio, video with audio codecs, and video codecs as digital audio by streaming media. Various codecs may be utilized to optimize the media stream based on application requirements and network bandwidth. Some implementations may rely on narrowband and compressed speech, while others may support high fidelity stereo codecs. Some popular codecs include μ-law and a-law versions of G.711, G.722, an open source voice codec known as iLBC, a codec that only uses 8 kbit/s each way called G.729, and the like. The SIP client and/or the voice over data network application 124 may further provide or assist in providing the functionality described herein including process 500. The voice over data network 202 may be implemented in conjunction with one or more servers.

Figure 2:
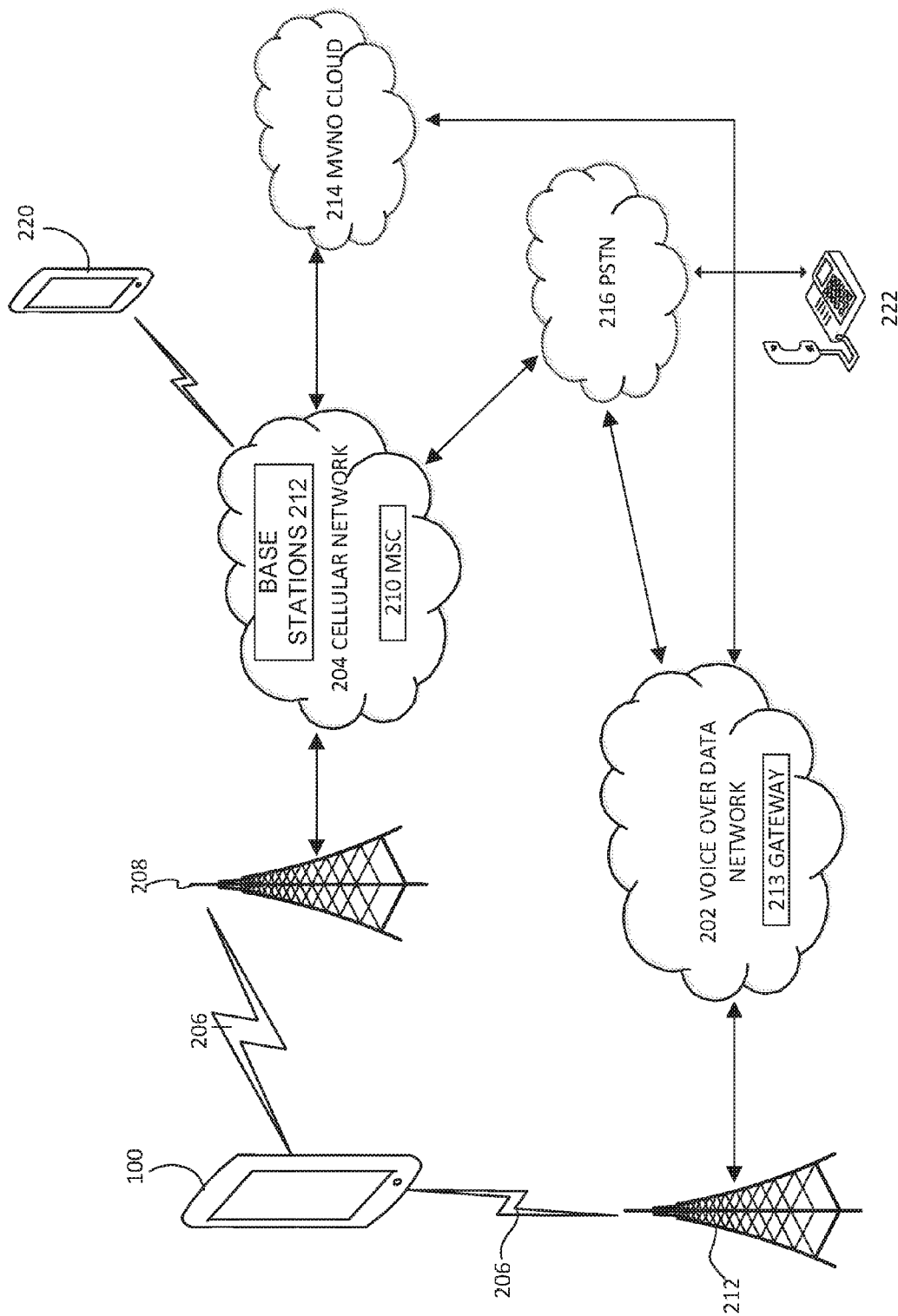
FIG. 2 illustrates a cellular network and a voice over data network in communication with the wireless device of FIG. 1, in accordance with aspects of the disclosure.

FIG. 2 illustrates a cellular network and a voice over data network in communication with the wireless device of FIG. 1, according to the disclosure. The wireless device 100 may connect to either a voice over data network 202 or a cellular network 204. The connection of the wireless device 100 to a network may be via a communication channel 206 as defined herein.

The cellular network 204 may have one or more base stations 208 (or nodes) for facilitating communication between the wireless device 100 and the cellular network 204. Cellular networks 204 may be associated with a Public Switched Telephone Network 216.

One or more cellular networks 204 may be associated with the MNO, and each cellular network 204 may have one or more mobile switching centers 210 for connecting phone calls by switching network paths. The mobile switching centers 210 may receive the dialed phone number from the wireless device 100 and route the call based on the locations of the calling device and the receiving device 220, 222.

The voice over data network 202, or voice over IP network, may have one or more base stations 212 (or nodes) for facilitating communication between the wireless device 100 and the voice over data network 202. The base stations 212 may be a wireless access point, a hotspot, and the like. The voice over data network 202 uses packets in digital format to transmit data. The data packets may be transferred over any IP network. The voice over data network 202 may use these data packets to call landline telephones 222 or other wireless devices 220. The voice over data network 202 may use a variety of protocols such as H.323, Media Gateway Control Protocol, Session Initiation Protocol, H.248, Real-Time Transport Protocol, Real-Time Transport Control Protocol, Skype Protocol, Inter-Asterisk eXchange (IAX), Jingle XMPP VoIP extensions, Teamspeak, and the like.

In one aspect, IP backhaul may allow the voice over data network 202 to connect with the cellular network 204. The voice over data network 202 may have a gateway 213 to connect the voice over data network 202 with the cellular network 204 and/or other networks associated with the Public Switched Telephone Network (PSTN 216). The intercommunication may be facilitated by the use of the E.164 numbering standard supported by both the voice over data network 202 and the cellular network 204. Both the voice over data network 202 and the cellular network 204 may also operate in coordination with the PSTN 216.

If the wireless device 100 is associated with a MVNO, the MVNO cloud 214 may operate outside of, but in communication with, one or more MNO-provided cellular networks 204 and/or one or more voice over data networks 202 to allow for service on a variety of carriers and networks.

Figure 3:
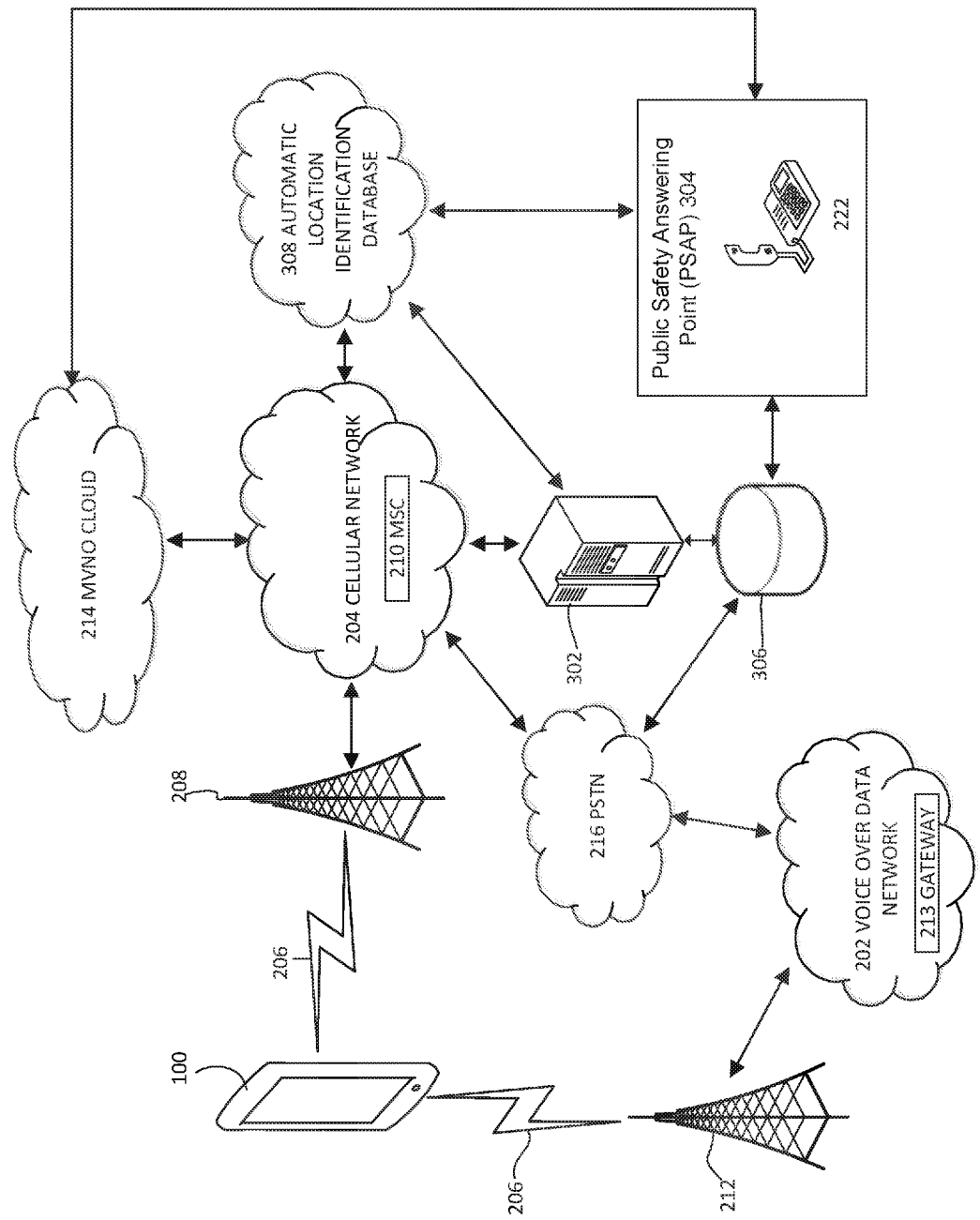
FIG. 3 illustrates a system for providing emergency call services to the wireless device of FIG. 1 using a voice over data network when a cellular network is available, in accordance with aspects of the disclosure.

FIG. 3 illustrates a system for providing emergency call services to the wireless device 100 of FIG. 1 using the voice over data network 202 when the cellular network 204 is available, according to the disclosure. The voice over data network 202 may recognize that an emergency call, such as a 911 call, has been placed by the wireless device 100. Upon recognizing the emergency call from the wireless device 100, the voice over data network 202 may determine whether the cellular network 204 is available to receive the emergency call.

Alternatively, the wireless device 100 may recognize that an emergency call, such as a 911 call, has been placed by the wireless device 100. Thereafter, the wireless device 100 may determine whether the cellular network 204 is available to receive the emergency call.

If the cellular network 204 is available to receive the emergency call, the voice over data network 202, the voice over data network application 124, or the wireless device 100 may redirect the call to the cellular network 204. The routing of a call from the voice over data network 202 to the cellular network 204 may be facilitated by the gateway 213 associated with the voice over data network 202. The gateway 213 may convert the call from one format to another. For example, the gateway 213 may direct the voice call on the voice over data network 202 to a Public Switched Telephone Network 216 where the emergency call may be received.

Upon receiving the emergency call with an associated emergency phone number at the cellular network 204, the mobile switching centers 210 may recognize the emergency number and direct the call to an emergency call tandem 302, even if the phone number associated with the wireless device 100 does not have a current cellular subscription. The emergency call tandem 302 can be an office or switch that may route the emergency call, based at least in part on an Automatic Number Identification and a designated Emergency Service Number, to a Public Safety Answering Point (PSAP) 304 via a dedicated trunk. The Automatic Number Identification is a way of determining a telephone number, and may include the calling party's telephone number and additional digits reflecting the type of phone service used by the device making the phone call.

A router 306 for the PSTN may alternatively route the emergency call to the PSAP 304. The PSAP 304 may be a call center responsible for answering emergency calls and dispatching relevant emergency services based on a particular location. Each PSAP 304 may have its own telephone number to which the emergency call is routed even when a generic emergency number such as 911 is dialed. There may be multiple PSAPs 304 in a given area.

The Automatic Number Identification may also be sent to an Automatic Location Identification system 308, which may find relevant location information associated with the call and may transmit that information to the PSAP 304. The cellular network 204 may also be in contact with the MVNO cloud 214, which may provide subscriber information for the wireless device 100, such as the registered location of the user, the wireless device telephone number, and the like.

The mobile switching centers 210 and the emergency call tandem 302 may be in communication with the Automatic Location Identification system 308, which may house location information for the wireless device 100. The Automatic Location Identification system 308 may transmit a caller's address or location. The location information may be provided by a user, the MVNO cloud 214 (if applicable), or may be estimated.

The location information may be estimated based, at least in part, on a global navigation satellite system (GNSS). The system may alternatively estimate the location of a wireless device 100 based on radiolocation or another form of network topology. Radiolocation in cellular telephony may use the base stations for determining location. For example, this may be determined through triangulation between radio towers. The location of the caller or handset can be determined several ways: Angle of arrival (AOA), which may require at least two towers, locating the caller at the point where the lines along the angles from each tower intersect; Time difference of arrival (TDOA), which may operate similar to a GNSS using multilateration, except that the networks may determine the time difference and therefore distance from each tower; and/or Location signature using "fingerprinting" to store and recall patterns (such as multipath) which wireless device signals are known to exhibit at different locations in each cell. The emergency call tandem 302 may then use a routing technology and the location associated with the wireless device 100 to determine the correct PSAP 304 to receive the emergency call.

Figure 4:
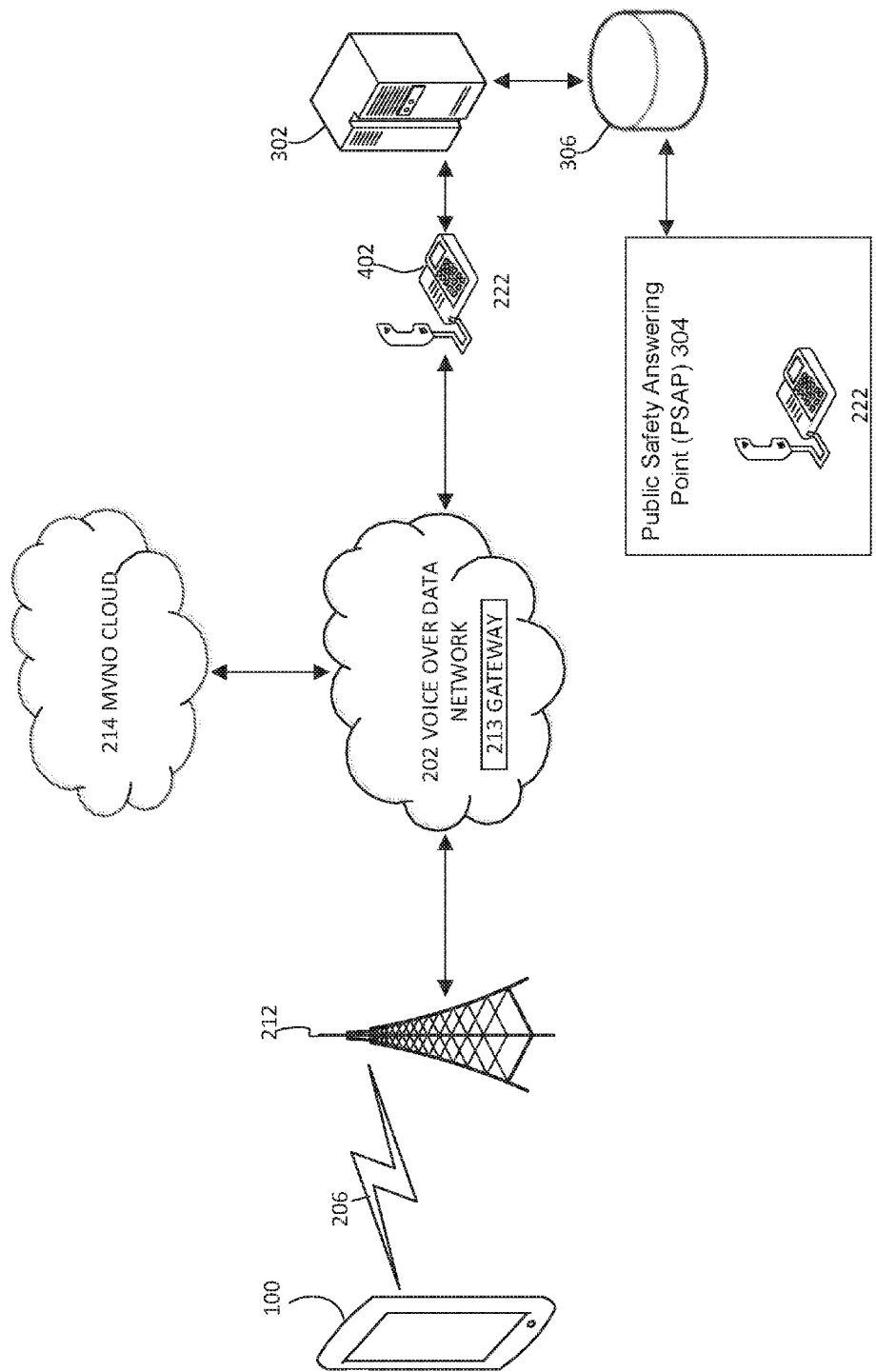
FIG. 4 illustrates a system for providing emergency call services to the wireless device of FIG. 1 using a voice over data network when a cellular network is not available, in accordance with aspects of the disclosure.

FIG. 4 illustrates a system for providing emergency call services to the wireless device 100 of FIG. 1 using the voice over data network 202 when the cellular network 204 is not available, according to the disclosure. If the voice over data network 202 and/or the wireless device 100 determines that there is no cellular network 204 available to receive the emergency call, the voice over data network 202 may route the emergency call to a national emergency call center 402, which may be a private national emergency call center. Transmitting the call to the national emergency call center 402 may be facilitated by the gateway 213 associated with the voice over data network 202.

If the location information for the wireless device 100 has been determined (using for example a GNSS as described above) it may be transmitted to the national emergency call center 402 from the voice over data network 202, the national emergency call center 402 may route the emergency call based on that location information. If the location information for the wireless device 100 is not available, however, the national emergency call center 402 may transmit a request for the location of the wireless device 100. Alternatively, an operator at the national emergency call center 402 may request the caller the caller's location. Once the national emergency call center 402 has received the location information, the national emergency call center 402 may use the emergency call tandem 302 and/or the selective router 306 to route the emergency call to the PSAP 304 corresponding to the location information of the wireless device 100.

There are several benefits to this system. One is that an emergency call may be placed to the proper PSAP 304 even when the wireless device 100 does not have access to a cellular network 204. Another is that a wireless device 100 capable of being used on networks provided by multiple carriers may have more calling options and therefore greater likelihood of successfully making an emergency call even if a particular cellular network 204 is not available or does not allow use of the wireless device 100 at a particular time or location. Another advantage of the system is that a wireless device 100 whose location during an emergency call may not be associated with the same PSAP 304 as the registered account location for the wireless device 100 may still be able to make an emergency call to the proper PSAP 304 given the location of the wireless device 100.

Figure 5:
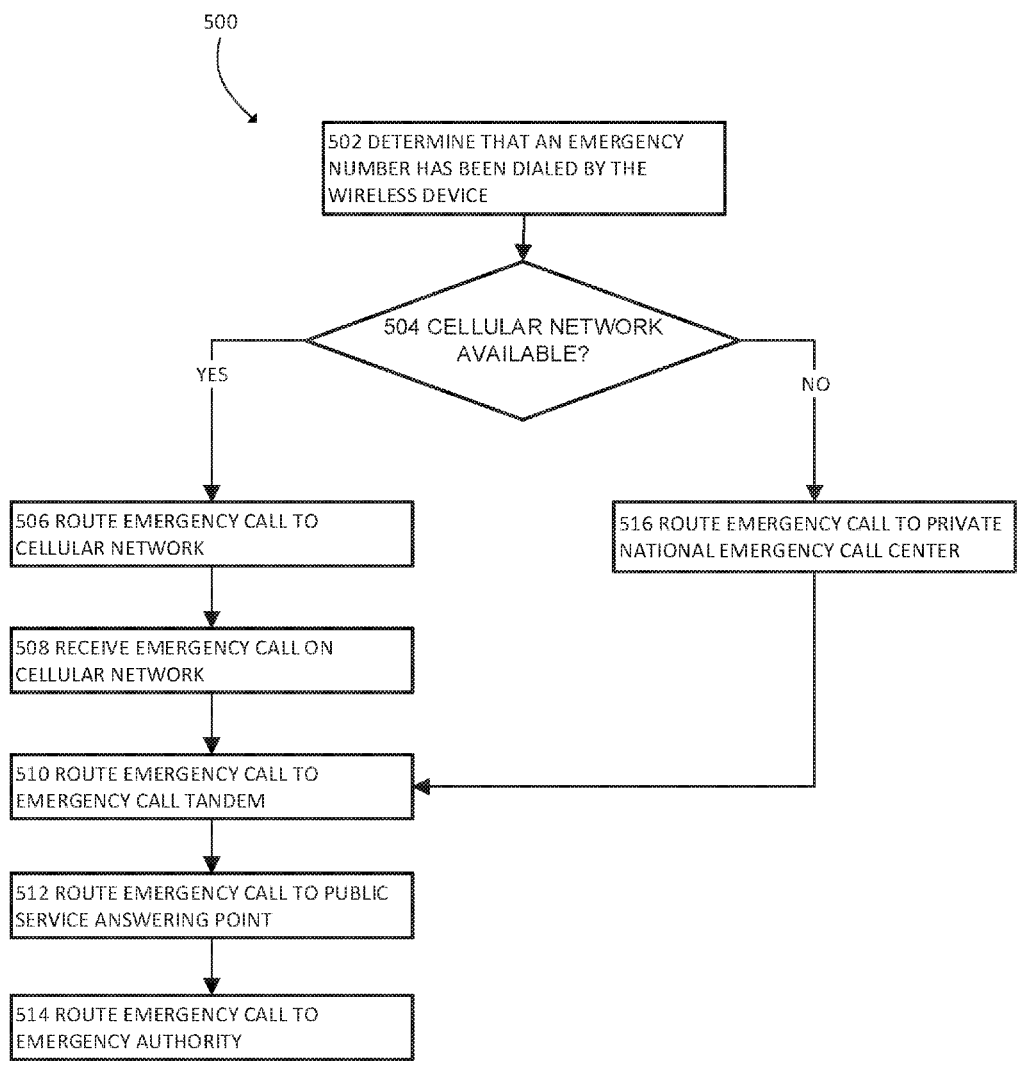
FIG. 5 illustrates an algorithm for providing emergency call services to the wireless device of FIG. 1 using a voice over data network, in accordance with aspects of the disclosure.

FIG. 5 illustrates a process 500 for providing emergency call service to a wireless device 100 of FIG. 1 using a voice over data network 202, according to the disclosure. At step 502, the system or the voice over data network application 124 may determine that the wireless device 100 has attempted to place an emergency call. The emergency call may be 911 or another predetermined number. Once the system or the voice over data network application 124 has determined that the wireless device 100 has attempted to place an emergency call, the system or the voice over data network application 124 determines whether a cellular network 204 is available at step 504. The determination step may be performed in part by the voice over data network 202 and/or or the voice over data network application 124 of the wireless device 100.

If the system or the voice over data network application 124 determines that there is a cellular network 204 available to the wireless device 100, the emergency call is routed to the available cellular network 204 in step 506. To route the emergency call to the cellular network, the gateway 213 may convert the call to the appropriate protocol. In step 508, the cellular network 204 may receive the emergency call and information related to the call, such as the phone number of the wireless device 100 and/or location information associated with the wireless device 100.

At step 510, the emergency call may be routed to the emergency call tandem 302. The routing may be accomplished with the mobile switching centers 210. The emergency call tandem 302 may receive the phone number of the wireless device 100 and other information related to the call, such as the location information (determined as described above). Based on the location information, the phone number, and/or other information associated with the call, the emergency call tandem 302 may at step 512 direct the emergency call to an appropriate PSAP 304, which may be associated with a particular location or service. At step 514, the PSAP 304 can route the emergency call to the proper emergency authority, such as a police station, fire department, or the like.

If, at step 504, the system or the voice over data network application 124 determines that a cellular network 204 is not available to process the emergency call, the emergency call may be routed at step 516 to a national emergency call center 402. This routing may be accomplished if, for example, Wi-Fi is available to direct the call over the voice over data network 202. The national emergency call center 402 may use the wireless device's location information if available, or may request the user's location. For example, the voice over data network 202 can have the wireless device user identify his/her location. Once the national emergency call center 402 has received the location information and/or other information associated with the emergency call, the emergency call may be routed to the emergency call tandem 302 at step 510 to continue the process. Ultimately the emergency call will be routed at step 512 to a PSAP 304 whether or not there is a cellular network 204 available to process the emergency call.

As described herein, the disclosure provides a device, system, and method for providing emergency calling solutions for wireless devices using voice over data networks. Moreover, the disclosure provides convenience, timeliness, and reliability with a solution for providing emergency calling service using voice over data increasing safety, saving lives, and benefiting society.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

The disclosure may include communication channels 206 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), 5G, EVolution-Data Optimized (EVDO) and/or the like, and/or a combination of two or more thereof.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In one aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GLASS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on the communication channel 206 as defined herein. The server may use memory with error detection and correction, redundant disks, redundant power supplies and so on.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless device configured to operate over a voice over data network and further configured to provide emergency telephone call solutions, the wireless device comprising:
   a wireless device transceiver configured to connect to a voice over data network and provide voice services;
   the wireless device transceiver further configured to connect to a cellular network and provide voice services;
   a wireless device processor configured to recognize an emergency call placed from the wireless device while operating over the voice over data network;
   the wireless device processor is further configured to determine whether a cellular network is available to receive the emergency call, if the cellular network is available, the wireless device processor is further configured to control the wireless device transceiver to transmit the emergency call over the cellular network to a Public Safety Answering Point; and
   the wireless device processor is further configured, if the cellular network is not available, to control the wireless device transceiver to transmit the emergency call over the voice over data network to a national emergency call center,
   wherein the wireless device comprises one of the following: a cellular phone or a smartphone.

2. The device of claim 1, wherein the wireless device transceiver is further configured to transmit information associated with the emergency call that includes location information for the wireless device.

3. The device of claim 2, wherein the location information for the wireless device is determined by one of the following: a device responsive to a global navigation satellite system and a mobile network operator.

4. The device of claim 1, further comprising a memory configured to store an application executed by the wireless device processor configured to provide the voice services over the voice over data network, determine whether a call is the emergency call, and place the emergency call over the cellular network.

5. A system implementing a voice over data network configured to provide emergency telephone call solutions to a wireless device, the system comprising:
   a server configured to implement, at least in part, a voice over data network and provide voice services to a wireless device via a wireless device transceiver;
   the server further configured to recognize an emergency call placed from the wireless device while providing the voice services over the voice over data network;
   the server further configured to determine whether a cellular network is available for the wireless device to receive the emergency call, if the cellular network is available, the server further configured to direct the wireless device to transmit the emergency call over the cellular network with the wireless device transceiver to a Public Safety Answering Point; and
   the server is further configured, if the cellular network is not available, to transmit the emergency call over the voice over data network to a national emergency call center,
   wherein the wireless device comprises one of the following: a cellular phone or a smartphone.

6. The system of claim 5, wherein the server is further configured to transmit information associated with the emergency call that includes location information for the wireless device.

7. The system of claim 6, wherein the location information for the wireless device is determined by one of the following: a device responsive to a global navigation satellite system and a mobile network operator.

8. A process of operating a wireless device over a voice over data network to provide emergency telephone call solutions, the process comprising:
   connecting to a voice over data network and providing voice services with a wireless device transceiver over the voice over data network;
   recognizing an emergency call placed from the wireless devices with a wireless device processor;
   determining whether a cellular network is available to receive the emergency call with the wireless device processor, if the cellular network is available, transmitting the emergency call over the cellular network with the wireless device transceiver to a Public Safety Answering Point; and transmitting, if the cellular network is not available, the emergency call over the voice over data network to a national emergency call center, wherein the wireless device comprises one of the following: a cellular phone or a smartphone.

9. The process of claim 8, further comprising transmitting information associated with the emergency call that includes location information for the wireless device with the wireless device transceiver.

10. The process of claim 9, wherein the location information for the wireless device is determined by one of the following: a device responsive to a global navigation satellite system and a mobile network operator.

11. The process of claim 8, further comprising storing in a memory an application executed by the wireless device processor for providing the voice services over the voice over data network voice, determining whether a call is the emergency call, and placing the emergency call over the cellular network.

12. A process for implementing a voice over data network and providing emergency telephone call solutions to a wireless device, the process comprising:

implementing a voice over data network and providing voice services to a wireless device via a wireless device transceiver with a server;

recognizing an emergency call placed from the wireless device with the server;

determining whether a cellular network is available with the server for the wireless device to receive the emergency call, if the cellular network is available, directing the wireless device to transmit the emergency call to the cellular network via the wireless device transceiver with the server to a Public Safety Answering Point; and transmitting the emergency call over the voice over data network with the server to a national emergency call center if the cellular network is not available, to transmit, wherein the wireless device comprises one of the following: a cellular phone or a smartphone.

13. The process of claim 12, further comprising controlling a routing of information associated with the emergency call that includes location information for the wireless device with the server.

14. The process of claim 13, wherein the location information for the wireless device is determined by one of the following: a device responsive to a global navigation satellite system and a mobile network operator.

15. The process of claim 12, further comprising transmitting the emergency call over the voice over data network with the server if the cellular network is not available, to transmit; and controlling a routing of information associated with the emergency call that includes location information for the wireless device with the server.

16. The process of claim 15, wherein the location information for the wireless device is determined by one of the following: a global navigation satellite system and a mobile network operator.

* * * * *